United States Patent
Shinohara et al.

(10) Patent No.: US 6,204,349 B1
(45) Date of Patent: *Mar. 20, 2001

(54) PIPE MADE OF POLYETHYLENE RESIN

(75) Inventors: Yoshinao Shinohara, Tokyo-To; Yasuhisa Mizuno, Kurashiki; Eiji Tanaka, Kurashiki; Yasuhiro Kashiwagi, Kurashiki; Miki Suzaki, Kurashiki; Koshi Yokoyama, Tokyo-To, all of (JP)

(73) Assignee: Mitsubishi Chemical Corporation, Tokyo-To (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/668,234

(22) Filed: Jun. 21, 1996

(30) Foreign Application Priority Data

Jun. 22, 1995 (JP) .................................. 7-156254

(51) Int. Cl.⁷ .................................................. C08F 110/02
(52) U.S. Cl. ............................................... 526/352.2
(58) Field of Search .......................... 428/35.7; 526/352, 526/352.2

(56) References Cited

U.S. PATENT DOCUMENTS

| | | | |
|---|---|---|---|
| 4,792,588 | * 12/1988 | Suga | 526/352 |
| 4,876,049 | * 10/1989 | Aoyama | 264/49 |
| 4,983,693 | * 1/1991 | Haag | 526/352 |
| 4,987,018 | * 1/1991 | Dickinson | 428/36.9 |
| 5,292,584 | * 3/1994 | Howard | 526/352 |
| 5,366,257 | * 11/1994 | McPherson | 285/174 |
| 5,382,643 | * 1/1995 | Howard | 526/352 |
| 5,474,398 | * 12/1995 | Prassas | 405/45 |
| 5,478,906 | * 12/1995 | Howard | 526/352 |
| 5,631,069 | * 5/1997 | Wooster | 428/220 |

* cited by examiner

*Primary Examiner*—Paul R. Michl
(74) *Attorney, Agent, or Firm*—Oblon, Spivak, McClelland, Maier & Neustadt, P.C.

(57) ABSTRACT

A pipe made of a polyethylene resin which is a linear polyethylene having the following physical properties (1) to (4):

(1) a melt flow rate of 0.02 to 0.2 g/10 min,
(2) a flow ratio of 50 or more,
(3) a density of 0.945 to 0.960 g/cm3, and
(4) a relaxation parameter H, represented by the following equation (I), of $2.00 \times 10^{-8}$ dyn/cm² or less:

$$H = -E(10^3) \frac{Log E(10^3) - Log E(10^0)}{Log 10^3 - Log 10^0} \quad \text{(I)}$$

wherein $E(\tau)$ represents a relaxation modulus at time $\tau$.

8 Claims, No Drawings

PIPE MADE OF POLYETHYLENE RESIN

BACKGROUND OF THE INVENTION

1. Field of the Invention

This invention relates to pipes made of polyethylene resins, excellent in rigidity, impact resistance and long-term durability under stress (environmental stress cracking resistance, internal pressure creep resistance).

2. Background Art

Polyethylene pipes are light in weight, easy to handle, and are non-corrosive. In addition, their rigidity is so high that they can be laid under the ground, and their flexibility is also so high that they can follow a movement of ground. Thanks to these advantageous characteristics, the amount of polyethylene pipes used is rapidly increasing in recent years.

Polyethylene pipes are required to have the following properties:

(1) the above-described characteristics;
(2) impact resistance sufficient to endure impacts given at the time when and after they are set; and
(3) excellent long-term durability under gas or water pressure (specifically, environmental stress cracking resistance and internal pressure creep resistance). The conventional polyethylene pipes already posess the above properties (1) and (2). With respect to the long-term durability (3), the conventional pipes can meet the ISO standard, i.e. 50-year durability at normal temperatures under an internal pressure, expressed in terms of circumferential stress, of approximately 8 MPa. However, the conventional polyethylene pipes are still insufficient in the long-term durability for use under severer conditions, such as main pipes for gases or running water which have a large diameter and undergo high internal pressure. For this reason, they are presently used only for branch pipes and the like, having a small diameter.

The long-term durability of a polyethylene pipe is considered to be determined by the environmental stress cracking resistance, that is the resistance to cracking which is caused when an internal pressure applied to the pipe acts, as a tensile stress in the circumferential direction, on the pipe over a long period of time. Therefore, in order to improve the long-term durability of polyethylene pipes, it is necessary to improve the environmental (tensile) stress cracking resistance.

The environmental stress cracking resistance of the conventional polyethylene materials for pipes, as evaluated by the method described below, have been found to be at most 20 hours.

In order to improve the environmental stress cracking resistance of a polyethylene, it is known to increase the molecular weight or to decrease the density of the polyethylene. However, when the molecular weight is increased, the fluidity of the polyethylene is lowered, so that the molding properties such as pipe-extrusion properties and injection moldability are impaired. When the density is decreased, the rigidity of the polyethylene is unfavorably lowered.

An object of the present invention is to overcome the aforementioned drawbacks in the prior art and provide pipes made of polyethylene resins, which have improved environmental stress cracking resistance and thus have improved long-term durability with the rigidity and impact resistance maintained high and which can be produced with good moldability at high productivity.

SUMMARY OF THE INVENTION

It has now been found that the above object can be attained by the use of a specific linear polyethylene resin having specific physical properties.

Thus, the present invention provides a pipe made of a polyethylene resin which is a linear polyethylene having the following physical properties (1) to (4):

(1) a melt flow rate of 0.02 to 0.2 g/10 min,
(2) a flow ratio of 50 or more,
(3) a density of 0.945 to 0.960 g/cm$^3$, and
(4) a relaxation parameter H, represented by the following equation (I), of $2.00 \times 10^{-8}$ dyn/cm$^2$ or less:

$$H = -E(10^3) \frac{\text{Log} E(10^3) - \text{Log} E(10^0)}{\text{Log} 10^3 - \text{Log} 10^0} \qquad (I)$$

wherein E(τ) represents a relaxation modulus at time τ.

The polyethylene pipes of the present invention have high rigidity and impact resistance and enhanced long-term durability (environmental stress cracking resistance and internal pressure creep resistance).

DETAILED DESCRIPTION OF THE INVENTION

The linear polyethylene for use in the present invention is preferably produced by the use of a Ziegler-Natta catalyst. A catalyst system composed of (a) a solid catalytic component containing at least Mg, Ti and halogen, and (b) an organoaluminum compound is suitable as the Ziegler-Natta catalyst. Examples of such a catalyst system include those described in Japanese Laid-Open Patent Publications Nos. 119980/1974, 58189/1974, 142689/1975 and 61406/1981. These catalysts are advantageous with respect to polymerization activity and coloring over other catalysts such as titanium trichloride-alkyl aluminum catalysts and titanium tetrachloride-trialkoxy vanadyl-alkyl aluminum catalysts. When a catalyst other than the Ziegler-Natta catalysts is used for producing a linear polyethylene, it is difficult to control the copolymerizability of monomers used and the molecular weight distribution of the resulting polyethylene; the intended environmental stress cracking resistance can be obtained with difficulty. Among the above-described Ziegler-Natta catalysts which can be suitably used in the present invention, preferred one is a catalyst system as described in Japanese Laid-Open Patent Publication No. 61406/1981, etc., consisting of (a) a reaction product of an oxygen-containing organic Mg compound, an oxygen-containing organic Ti compound and an organoaluminum halide, and (b) an organoaluminum compound. This catalyst system has particularly high activity, can easily control the molecular weight distribution of the resulting polyethylene, and hardly produce fish eyes in the resulting polyethylene.

A compound represented by the following general formula:

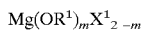

$$\text{Mg}(\text{OR}^1)_m \text{X}^1_{2-m}$$

wherein R$^1$ represents an alkyl, aryl or cycloalkyl group, X$^1$ represents a halogen atom, and m is 1 or 2, may be used as the oxygen-containing organic Mg compound for preparing the reaction product. Specific examples of such a compound include magnesium diethoxide, magnesium dimethoxide, magnesium diphenoxide, magnesium monoethoxychloride, magnesium monophenoxychloride, magnesium monoethoxybromide and magnesium monoethoxyiodide. Of these, magnesium diethoxide is particularly preferred.

A compound represented by the following general formula:

$$Ti(OR^2)_n X^2_{4-n}$$

wherein $R^2$ represents an alkyl, aryl or cycloalkyl group, $X^2$ represents a halogen atom, and n is 1 to 4, may be used as the oxygen-containing organic Ti compound. Specific examples of such a compound include tetraethoxytitanium, tetra-n-butoxytitanium, diethoxydichlorotitanium, di-n-butoxydichlorotitanium, triethoxymonochlorotitanium, tri-n-butoxymonochlorotitanium, ethoxytrichlorotitanium, n-butoxytrichlorotitanium and methoxytribromotitanium. Of these, tri-n-butoxymonochlorotitanium is particularly preferred.

A compound represented by the following general formula:

$$AlR^3_p X^3_{3-p}$$

wherein $R^3$ represents an alkyl, aryl or cycloalkyl group, $X^3$ represents a halogen atom, and p is a number in the range of 0<p<3, may be used as the organoaluminum halide. Specific examples of such a compound include ethyl aluminum dichloride, ethyl aluminum sesquichloride, diethyl aluminum monochloride and n-propyl aluminum dichloride. Of these, ethyl aluminum sesquichloride is particularly preferred.

The above-described compounds are reacted in the following manner:

First of all, an oxygen-containing organic Mg compound and an oxygen-containing organic Ti compound are mixed with each other, and the mixture is heated to 100–160° C. to obtain a homogeneous liquid. When the mixture cannot be readily made into a homogenous liquid, it is preferable to allow an alcohol to exist in the mixture. Examples of the alcohol include ethyl alcohol, n-butyl alcohol and n-octyl alcohol.

Subsequently, an inert hydrocarbon solvent is added to the liquid to obtain an inert hydrocarbon solution. To this inert hydrocarbon solution, an organoaluminum halide is added, and the mixture is subjected to reaction at a temperature ranging from room temperature to 100° C. The reaction product is obtained as a precipitate, and the unreacted matter is removed by washing with an inert hydrocarbon solvent.

With respect to the amounts of the above components, the molar ratio of the titanium compound to the magnesium compound, Ti/Mg, is preferably from 0.1 to 10, and the ratio of the number of moles of the aluminum compound to the sum of the number of moles of the magnesium compound and that of the titanium compound, (Al compound)/{(Mg compound)+(Ti compound)}, is preferably from 1 to 20.

On the other hand, a compound represented by the following general formula:

$$AlR^4_q X^4_{3-q}$$

wherein $R^4$ represents an alkyl, aryl or cycloalkyl group, $X^4$ represents a halogen atom, and q is a number of 1 to 3, may be used as the organoaluminum compound which is employed as the co-catalyst (b). Specific examples of such a compound include triethyl aluminum, tri-n-propyl aluminum, tri-n-butyl aluminum, tri-i-butyl aluminum, diethyl aluminum monochloride and di-n-propyl aluminum monochloride. Of these, triethyl aluminum and diethyl aluminum monochloride are preferred. In particular, when diethyl aluminum monochloride is used, the resulting polymer has a broad molecular weight distribution covering from high to low molecular weights, and the molecular weights of high-molecular-weight fractions can be easily increased to ultra high. The molecular weight distribution can thus be controlled quite freely. In addition, fish eyes are hardly produced in the resulting polymer. In general, the polymerization activity tends to be lowered when diethyl aluminum monochloride is used as the co-catalyst. It is therefore essential to use a solid catalytic component which can show higher activity. Also from this point, it is preferable to use the catalyst described in Japanese Laid-Open Patent Publication No. 61406/1981, etc. It is noted that a mixture of the above organoaluminum compounds can also be used.

The homopolymerization of ethylene, or the copolymerization of ethylene with other α-olefin may be carried out at a temperature of 40 to 100° C. by using the above-described catalyst system. The polymerization can be conducted either by gas-phase polymerization, or by slurry polymerization carried out in a hydrocarbon solvent. Examples of the hydrocarbon solvent include inert hydrocarbon solvents, for instance, aliphatic hydrocarbons such as hexane and heptane, aromatic hydrocarbons such as benzene, toluene and xylene, and alicyclic hydrocarbons such as cyclohexane and methylcyclohexane.

The α-olefin other than ethylene, as a comonomer, is a compound represented by the following general formula:

$$R^5{-}CH{=}CH_2$$

wherein $R^5$ represents an alkyl group having 1 to 12 carbon atoms. Specific examples of such a compound include propylene, 1-butene, 1-hexene and 4-methyl-1-pentene. The amount of the comonomer to be used is, in general, 5% by weight or less.

The polyethylene resin for use in the present invention can be produced (ethylene can be homopolymerized, or ethylene and other alpha-olefin can be copolymerized) using the above-described highly-active Ziegler-Natta catalyst by a low-pressure multiple-stage polymerization carried out in two or more reaction zones of different reaction conditions. A preferred example of the method of production is as follows:

When ethylene and an α-olefin having 3 to 12 carbon atoms are copolymerized by using the Ziegler-Natta catalyst, (a) the polymerization reaction is carried out in two stages, that is, in the presence of the reaction product obtained by the polymerization carried out in the first reaction zone, the polymerization is further continued in the second reaction zone;

(b) in either one of the first and second reaction zones, ethylene is homopolymerized in the presence of hydrogen, the molar ratio of the hydrogen to the ethylene contained in the gas phase being from 0.5 to 5, so as to produce polymer A in an amount of 30–70% by weight of the amount of the polymer finally produced;

(c) in the other reaction zone, ethylene and the α-olefin are copolymerized in the presence of hydrogen, the molar ratio of the hydrogen to the ethylene contained in the gas phase being from 0.001 to 0.5, so as to produce polymer B in an amount of 30–70% by weight of the amount of the polymer finally produced; and (d) the polymerization conditions are so controlled that the final polymer has the previously-mentioned physical properties, that is, an MFR of 0.02 to 0.2 g/10 min, an FR of 50 to 170, a density (ρ) of 0.945 to 0.960 g/cm$^3$, and a relaxation parameter H of 2.00×10$^{31\ 8}$ dyn/cm$^2$ or less.

The two-stage polymerization (a) can be carried out either continuously or batchwise. In the case of the continuous polymerization, reactors are connected in series; the reaction product produced in the first reactor is introduced to the second reactor, in which the polymerization is further continued. On the other hand, in the case of the batch-wise polymerization, successive reactions are carried out in one reactor. Of these, the continuous polymerization is preferred.

The two-stage polymerization reaction, carried out in the manner described above in (b) and (c), is conducted under such polymerization conditions that can provide a final polymer having the physical properties shown in (d). In particular, the MFR, FR and density can be adjusted to the values shown in (d) by controlling, in (b) and (c), the amounts of ethylene, hydrogen and the catalyst to be supplied, the proportion of the polymer produced in the first stage to the polymer produced in the second stage, and/or the polymerization temperature. The parameter H can be adjusted to the specific range by controlling the MFR, FR and density, as will be described in more detail below.

We hitherto used to vary the density (ρ) and MFR independently in order to improve the durability of a polyethylene pipe. However, we have now paid our attention to the relaxation parameter H, and found that the durability is governed by this parameter H and that the parameter H can be controlled by the MFR, FR and ρ. Thus, by suitably adjusting the MFR, FR and ρ in the above specific ranges, it is possible to make the parameter H fall in the desired range, which provides a polyethylene pipe having improved durability. The parameter H can be adjusted by a method in which the three factors, MFR, FR and ρ, are adjusted within the above ranges, or by a method in which any two of these factors are set at predetermined values in the above ranges and the remaining one factor is adjusted within the above range.

The polyethylene resin, obtained in the manner described hereinabove, thus is a linear polyethylene having the following physical properties (1) to (4):

(1) a melt flow rate (MFR) of 0.02 to 0.2 g/10 min, preferably 0.03 to 0.15 g/10 min, more preferably 0.03 to 0.1 g/10 min;

(2) a flow ratio (FR) of 50 or more, preferably 60 or more, more preferably 75 or more;

(3) a density of 0.945 to 0.960 g/cm$^3$, preferably 0.948 to 0.960 g/cm$^3$, more preferably 0.950 to 0.955 g/cm$^3$; and (4) a relaxation parameter H, represented by the above equation (I), of 2.00×10$^{-8}$ dyn/cm$^2$ or less, preferably 1.95×10$^{-8}$ dyn/cm$^2$ or less, more preferably 1.90×10$^{-8}$ dyn/cm$^2$ or less.

When the MFR is less than the above range, the fluidity of the polyethylene is considerably lowered. The moldability of such a polyethylene is insufficient, so that the productivity of pipes is low. Further, the polyethylene cannot be molded into joints or the like by means of injection molding, or even if they can be obtained, the appearance thereof is very bad. On the other hand, when the MFR is in excess of the above range, a resin coming out of a die at the time of molding tends to sag, so that molding cannot be successfully conducted. Moreover, the resulting pipe is insufficient in the long-term durability and impact resistance.

The FR is a measure of the molecular weight distribution of a polyethylene. It is determined as a value obtained by dividing the amount of resin extruded from a melt indexer at 190° C. under a load of 11.6 kg for 10 minutes by the extruded amount at the same temperature under a load of 1.16 kg for 10 minutes. A small FR value indicates that the molecular weight distribution is narrow, and conversely, a large FR value indicates that the molecular weight distribution is broad. When the FR is less than the above-described range, the polymer is poor in moldability. The upper limit of the FR is, in general, approximately 170. When the FR is too large, the polymer is likely to have poor impact resistance due to the influence of the low-molecular-weight fractions thereof.

When the density is lower than the above-described range, the polymer is insufficient in rigidity. A pipe made of this polymer, when used under the ground, will be readily deformed due to the ground pressure. On the other hand, a pipe made of a polyethylene having a density higher than the above range is insufficient in the long-term durability.

The relaxation parameter H is a parameter drawn from the theory described below. A polyethylene whose H is in the above specific range is excellent in the long-term durability.

It is considered that in order to obtain good long-term durability, the proportion of a fraction whose stress relaxation time is short is required to be large. It has been known that the stress relaxation can be evaluated by evaluating a relaxation modulus curve obtainable by measuring the change of modulus with time, where the modulus can be obtained by dividing the stress that is produced in a specimen when a certain degree of distortion is caused therein by the degree of the distortion.

In practice, the relaxation modulus over a long period of time is obtained by measuring the change of modulus with temperatures, and utilizing the temperature-time conversion rule. A method for obtaining a relaxation distribution function from such relaxation modulus has been proposed by Schwarz-Staverman, Leaderman, et al. (see "Buttai no Henkeigaku" published by Seibundo Shinkosha in 1972, pp. 201–204). According to their report, a relaxation spectrum h(j) at time j can be given by the following equation (II):

$$h(j) = \lim_{k \to x} \frac{(-1)^k}{(k-1)!} (kj)^k E^{(k)}(kj) \tag{II}$$

wherein $E^{(k)}(kj)=d^k E/dt^k$, which is the value obtained by differentiating k times the relaxation modulus by time t.

Approximation of K=1 in equation (II) gives the following equation (III):

$$h(j) = -j\frac{dE(j)}{dt} = \frac{dE(j)}{d(\ln j)} = -E(j)\frac{d(\ln E)}{d(\ln j)} \tag{III}$$

When the relaxation distribution function h(10$^3$) at a long time (j=10$^3$ sec) is indicated by H, H can be given by the following equation (IV):

$$H = -E(10^3)\frac{d\,\text{Log}E(j)}{d\,\text{Log}j}\bigg|_{j=10^3} \tag{IV}$$

When the value measured at 10$^0$ sec is used, the following equation (V) can be obtained:

$$\frac{d\,\text{Log}E}{d\,\text{Log}j} = \frac{\text{Log}E(10^3) - \text{Log}E(10^0)}{\text{Log}10^3 - \text{Log}10^0} \quad \text{(V)}$$

H can therefore be calculated by the following equation (I), using experimental values:

$$H = -E(10^3)\frac{\text{Log}E(10^3) - \text{Log}E(10^0)}{\text{Log}10^3 - \text{Log}10^0} \quad \text{(I)}$$

The relaxation parameter $H(\text{dyn/cm}^2)$ given by the above equation (I) is thus a parameter corresponding to the relaxation distribution function at a specific time ($10^3$ sec), and can be determined by using experimental values. An H value falling within the above-described range denotes that the relaxation distribution function at a long time is small. This means that the proportion in a polymer of a fraction whose stress relaxation time is long is small; such an H is thus preferred.

Optional components can be incorporated into the polyethylene resin for use in the present invention. Examples of the optional components include those additives and compounding agents which have been known or used for conventional polyolefins, for example, antioxidants, neutralizing agents, weather-resistance improvers, foam inhibitors, dispersing agents, antistatic agents, slip agents, molecular-weight modifiers (peroxides, etc.), heat stabilizers, light stabilizers, ultraviolet absorbers, lubricants, anti-fogging agents, anti-blocking agents, flame retarders, electrical conductivity-imparting agents, crosslinking agents, crosslinking aids, metal-inactivating agents, bactericides, mildewproofing agents, fluorescent whitening agents, fillers, coloring agents, releasing agents, foaming agents, clarifiers, processing aids, nucleating agents, softening agents or hardness modifiers (oils, waxes, etc.), gloss agents, emboss-sharpening agents, and physical-property modifiers (other resins, rubbers, etc.).

The above-described polyethylene resin and optional components can be directly fed into a molding machine to conduct molding; however, it is generally preferred to melt-knead these components to obtain beforehand a pelleted molding material, which is then subjected to molding. In general, pipes are produced by means of extrusion molding. However, pipe joints and the like can be obtained also by injection molding. There may be a case where a multi-layer pipe is produced by molding.

EXAMPLES

The present invention will now be explained more specifically by referring to the following examples. In the examples, the physical properties of the resins were evaluated by the following methods.

MFR: Measured in accordance with JIS K6760.

Density: Measured in accordance with JIS K6760.

Impact resistance: The Izod impact strength was measured (at 23° C.) in accordance with JIS K7110.

Stiffness: Measured in accordance with ASTM D747.

Environmental stress cracking resistance (ESCR):

Measured in accordance with JIS K6760, using an apparatus for testing environmental stress cracking resistance under a constant stress, under the following conditions: water temperature=80° C., test solution=1% aqueous solution of a higher alcohol in sodium sulfonate, and initial tensile load=4 MPa. The specimens used were plates having a thickness of 1 mm, with a notch of a depth of 0.3 mm provided at the center. The period of time (hours) until a crack occurred in the specimen was measured.

Stress relaxation (Relaxation parameter H): Measured by using an optorheometer "HRS-100" manufactured by Oku Seisakusho Co., Ltd. Specimens of 30 mm×5 mm×0.3 mm were prepared by press molding, followed by annealing at 100° C. for 10 hours. The stress relaxation after the specimen was stretched 1 mm at a rate of 1 mm/sec was measured at various temperatures; and the relaxation parameter H was determined by using the master curve at 30° C.

Internal pressure creep resistance: By using a 65-mm φ extruder manufactured by Toshiba Machine Co., Ltd., a spiral die manufactured by Yasuda Kiko Kabushiki Kaisha and a vacuum cooling water bath manufactured by IKG Co., Ltd., a pipe having an outer diameter of 60 mm and a wall thickness of 5 mm was prepared under the following conditions: resin temperature=ca. 210° C., temperature of cooling water in water bath=ca. 20° C., and take-off speed=ca. 65 cm/min. The creep resistance test of this pipe was conducted in accordance with ISO-DIS 1167 (at 80° C. under such internal pressure that the circumferential stress of the pipe was 5 MPa), and the period of time (hours) until a crack occurred in the pipe was measured.

Example 1

(A) Preparation of Solid Catalyst 115 g of $Mg(OC_2H_5)_2$, 151 g of $Ti(OC_4H_9)_3$ and 37 g of $n\text{-}C_4H_9OH$ were mixed at 150° C. for 6 hours to obtain a homogeneous mixture, and the mixture was then cooled. To this mixture was added a predetermined amount of benzene, thereby obtaining a homogenous solution.

Subsequently, 457 g of ethyl aluminum sesquichloride was added dropwise to the solution at a predetermined temperature. The mixture was stirred for one hour, and then repeatedly washed with n-hexane to obtain 220 g of a solid catalyst.

(B) Polymerization

By using the above-obtained catalyst component (in an amount of approximately 1 kg, corresponding to the amount of 5 batches of Example 1 (A)), and two 0.6-m³ reactors connected in series, continuous polymerization was carried out.

70 kg/hr of n-hexane, 3.63 g/hr of diethyl aluminum monochloride, 1.88 g/hr of the solid catalytic component, 31 kg/hr of ethylene and hydrogen were continuously supplied to the first polymerizer, and continuous polymerization was carried out at a temperature of 90° C. while keeping the molar ratio of hydrogen/ethylene in the gas phase at 2.8.

To the second polymerizer, 47 kg/hr of n-hexane and 25.7 kg/hr of ethylene were continuously supplied while continuously supplying the polymer slurry from the first polymerizer, and continuous polymerization was carried out at a temperature of 65° C. while keeping the molar ratio of hydrogen/ethylene and that of 1-butene/ethylene in the gas phase at 0.05 and at 0.05, respectively.

The slurry was continuously drawn from the second polymerizer, and placed in a centrifugal separator to conduct solid-liquid separation. The polymer separated was then dried. A small amount of the slurry was periodically sampled from both the first and second polymerizers, and analyzed to determine the polymer concentration. The continuous polymerization was carried out in this manner for three days, whereby a polymer in which the proportion of the polymer produced at the first stage to the polymer produced at the second stage was 60:40 was obtained. The polymer obtained was kneaded and pelletized by using a 90-mmφ extruder, and then subjected to the measurement of the physical properties. The results are shown in Table 1.

Example 2

The procedure of Example 1 was repeated except that the molar ratio of hydrogen/ethylene in the gas phase in the first polymerizer was changed to 3.3, and the molar ratio of hydrogen/ethylene and that of 1-butene/ethylene in the gas phase in the second polymerizer were changed to 0.08 and 0.04, respectively.

Example 3

The procedure of Example 1 was repeated except that the diethyl aluminum monochloride used as a co-catalyst was changed to triethyl aluminum and that the molar ratio of hydrogen/ethylene in the gas phase in the first polymerizer was changed to 2.2, and the molar ratio of hydrogen/ethylene and that of 1-butene/ethylene in the gas phase in the second polymerizer were changed to 0.01 and 0.1, respectively.

Example 4

The procedure of Example 3 was repeated except that the molar ratio of hydrogen/ethylene in the gas phase in the second polymerizer was changed to 0.03, and the proportion of the first-stage polymer to the second-stage polymer was changed to 50:50.

Example 5

The procedure of Example 1 was repeated except that the molar ratio of hydrogen/ethylene in the gas phase in the first polymerizer was changed to 5.0, the molar ratio of hydrogen/ethylene and that of 1-butene/ethylene in the gas phase in the second polymerizer were changed to 0.15 and 0.05, respectively, and the proportion of the first-stage polymer to the second-stage polymer was changed to 52:48.

Comparative Example 1

The procedure of Example 1 was repeated except that the molar ratio of hydrogen/ethylene in the gas phase in the first polymerizer was changed to 2.5, the molar ratio of hydrogen/ethylene and that of 1-butene/ethylene in the gas phase in the second polymerizer were changed to 0.4 and 0.05, respectively, and the proportion of the first-stage polymer to the second-stage polymer was changed to 50:50.

Comparative Example 2

The procedure of Example 5 was repeated except that the molar ratio of hydrogen/ethylene and that of 1-butene/ethylene in the gas phase in the second polymerizer were changed to 0.25 and 0.01, respectively, and the proportion of the first-stage polymer to the second-stage polymer was changed to 51:49.

Comparative Example 3

The procedure of Example 5 was repeated except that the molar ratio of hydrogen/ethylene and that of 1-butene/ethylene in the gas phase in the second polymerizer were changed to 0.25 and 0.12, respectively, and the proportion of the first-stage polymer to the second-stage polymer was changed to 48:52.

Comparative Example 4

The procedure of Example 5 was repeated except that the molar ratio of hydrogen/ethylene and that of 1-butene/ethylene in the gas phase in the second polymerizer were changed to 0.25 and 0.015, respectively, and the proportion of the first-stage polymer to the second-stage polymer was changed to 51:49.

Comparative Example 5

The procedure of Comparative Example 1 was repeated except that the molar ratio of hydrogen/ethylene in the gas phase in the first polymerizer was changed to 1.2, and the molar ratio of hydrogen/ethylene and that of 1-butene/ethylene in the gas phase in the second polymerizer were changed to 0.2 and 0.07, respectively.

Comparative Example 6

The procedure of Comparative Example 1 was repeated except that the molar ratio of hydrogen/ethylene in the gas phase in the first polymerizer was changed to 3.8, the molar ratio of hydrogen/ethylene and that of 1-butene/ethylene in the gas phase in the second polymerizer were changed to 0.33 and 0.05, respectively, and the proportion of the first-stage polymer to the second-stage polymer was changed to 40:60.

TABLE 1

| Example No. | MFR (g/10 min) | FR | Density (g/cm$^3$) | H × 10$^{-8}$ (dyn/cm$^2$) | Izod Impact Strength (kg-cm/cm$^2$) | Stiffness (kg/cm$^2$) | ESCR (hr) | Internal Pressure Creep Resistance (hr) |
|---|---|---|---|---|---|---|---|---|
| Example 1 | 0.08 | 90 | 0.953 | 1.86 | NB | 11000 | 250 | >1000 |
| 2 | 0.06 | 110 | 0.954 | 1.78 | NB | 11000 | 300 | >1000 |
| 3 | 0.08 | 120 | 0.953 | 1.84 | NB | 11000 | >500 | >1000 |
| 4 | 0.07 | 80 | 0.953 | 1.71 | NB | 11000 | 400 | >1000 |
| 5 | 0.03 | 100 | 0.952 | 1.90 | NB | 10500 | 300 | >1000 |
| Comp. Example | | | | | | | | |
| 1 | 0.28 | 60 | 0.953 | 1.84 | 14 | 11000 | 3 | 30 |
| 2 | 0.12 | 90 | 0.962 | 2.10 | 10 | 13000 | 5 | 100 |
| 3 | 0.20 | 60 | 0.943 | 1.70 | 13 | 8500 | 250 | >1000 |
| 4 | 0.12 | 85 | 0.960 | 2.02 | 10 | 12500 | 30 | 500 |
| 5 | 0.20 | 60 | 0.955 | 2.10 | NB | 12000 | 4 | 60 |
| 6 | 0.17 | 62 | 0.954 | 2.30 | 11 | 11000 | 20 | 500 |

Note) NB: not broken

What is claimed is:

1. A method of improving the internal pressure creep resistance and environmental stress cracking resistance of a polyethylene pipe, comprising:

molding a linear polyethylene having the following characteristics:
(1) a melt flow rate (MFR) of 0.02–02 g/10 min.;
(2) a flow ratio of 50 or more;
(3) a density of 0.945–0.960 g/cm$^3$; and
(4) a relaxation parameter H, represented by the following equation (I), of $2.00 \times 10^{-8}$ dyn/cm$^2$ or less:

$$H = -E(10^3) \frac{\mathrm{Log}E(10^3) - \mathrm{Log}E(10^0)}{\mathrm{Log}10^3 - \mathrm{Log}10^0} \quad (I)$$

wherein $E(\tau)$ represents a relaxation modulus at time $\tau$, into the shape of a pipe.

2. The method according to claim 1, wherein the linear polyethylene is a polyethylene prepared by polymerizing ethylene in the presence of a Ziegler-Natta catalyst consisting of (a) a reaction product of an oxygen-containing organic Mg compound, an oxygen-containing organic Ti compound and an organoaluminum halide, and (b) an organoaluminum compound.

3. The method according to claim 1, wherein the oxygen-containing organic Mg compound is magnesium diethoxide.

4. The method according to claim 1, wherein the oxygen-containing organic Ti compound is tri-n-butoxymonochlorotitanium.

5. The method according to claim 1, wherein the organoaluminum halide is ethylaluminum sesquichloride.

6. The method according to claim 1, wherein the organoaluminum compound is ethylaluminum or diethylaluminum monochloride.

7. The method according to claim 1, wherein said (1) melt flow rate (MFR) ranges from 0.03–0.15 g/10 min, said (2) flow ratio (FR) is at least 60, said (3) density ranges from 0.948–0.960 g/cm$^3$ and said relaxation parameter H is no more than $1.95 \times 10^{-8}$ dyn/cm$^2$.

8. The method according to claim 7, wherein said (1) melt flow rate (MFR) ranges from 0.03–0.1 g/10 min, said (2) flow ratio (FR) is at least 75, said (3) density ranges from 0.950–0.955 g/cm$^3$ and said relaxation parameter H is no more than $1.90 \times 10^{-8}$ dyn/cm$^2$.

* * * * *